(12) United States Patent
Vishnia (10) Patent No.: US 12,111,512 B2
(45) Date of Patent: Oct. 8, 2024

(54) MOUNT FOR AN OPTICAL STRUCTURE AND METHOD OF MOUNTING THE OPTICAL STRUCTURE TO THE MOUNT

(71) Applicant: PLX, Inc., Deer Park, NY (US)

(72) Inventor: Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 845 days.

(21) Appl. No.: 17/122,418

(22) Filed: Dec. 15, 2020

(65) Prior Publication Data

US 2022/0187567 A1  Jun. 16, 2022

(51) Int. Cl.
 *G02B 7/198* (2021.01)

(52) U.S. Cl.
 CPC .................... *G02B 7/198* (2013.01)

(58) Field of Classification Search
 CPC ...................................................... G02B 7/198
 USPC ........ 248/576, 580, 603, 610, 611, 614, 615
 See application file for complete search history.

(56) References Cited

U.S. PATENT DOCUMENTS

| | | |
|---|---|---|
| 2,518,632 A | 8/1950 | O'Brien et al. |
| 2,782,298 A | 2/1957 | Scholz et al. |
| 3,145,933 A | 8/1964 | Dickson |
| 3,843,236 A | 10/1974 | Kurz, Jr. et al. |
| 4,065,206 A | 12/1977 | Tausch et al. |
| 4,613,972 A | 9/1986 | Bettman |
| 4,980,786 A * | 12/1990 | O'Sullivan ........ G11B 33/1406 360/99.18 |
| 5,033,219 A | 7/1991 | Johnson et al. |
| 5,240,222 A * | 8/1993 | Seeley ................ F16F 15/08 248/610 |
| 5,366,198 A * | 11/1994 | Dickinson ........... F16F 15/04 248/603 |
| 5,721,646 A | 2/1998 | Catlin et al. |

(Continued)

FOREIGN PATENT DOCUMENTS

| | | |
|---|---|---|
| CN | 205721053 U | 11/2016 |
| CN | 206178227 U | 5/2017 |

(Continued)

OTHER PUBLICATIONS

International Search Report issued in PCT/US21/72509, mailed Feb. 8, 2022.

*Primary Examiner* — Kimberly T Wood
(74) *Attorney, Agent, or Firm* — ICE MILLER LLP; Safet Metjahic (57) ABSTRACT

An improved mount for, and method of mounting, an optical structure comprising at least two mirror panels secured in reflective relation to each other between upper and lower support members of the optical structure, is provided. The mount has a bracket element, comprising top and bottom panels secured along a back panel. There are at least six mounting pads, at least three attach portions of an outside surface of the upper support member of the optical structure to portions of an inside surface of the top panel of the bracket, and at least three attach portions of an outside surface of the lower support member of the optical structure to portions of an inside surface of the bottom panel of the bracket. The middle of the set of three top and bottom mounting pads are formed from polymeric material having a first Durometer value, and the two outer of the set of three top and bottom mounting pads are formed from polymeric material having a second Durometer value.

27 Claims, 5 Drawing Sheets

(56) References Cited

U.S. PATENT DOCUMENTS

| | | | |
|---|---|---|---|
| 5,801,891 A * | 9/1998 | Lloyd | G02B 7/182 |
| | | | 248/475.1 |
| 6,325,520 B1 | 12/2001 | Hanft et al. | |
| 6,327,024 B1 | 12/2001 | Hayashi et al. | |
| 6,533,256 B1 * | 3/2003 | Warren | F16F 7/02 |
| | | | 248/580 |
| 6,671,124 B2 * | 12/2003 | Guion | G11B 33/08 |
| | | | 248/603 |
| 6,771,437 B1 | 8/2004 | Willis | |
| 6,859,337 B2 | 2/2005 | Oshino et al. | |
| 6,906,844 B1 * | 6/2005 | Siahpoushan | G02F 1/0131 |
| | | | 359/305 |
| 7,168,817 B2 | 1/2007 | Bleier et al. | |
| 8,267,611 B2 | 9/2012 | Paatzsch et al. | |
| 8,416,386 B2 | 4/2013 | Margeson et al. | |
| 8,531,045 B2 | 9/2013 | Ari | |
| 9,018,724 B2 | 4/2015 | Ting et al. | |
| 9,134,501 B2 | 9/2015 | Schaffer et al. | |
| 9,958,638 B2 | 5/2018 | Naepflin et al. | |
| 2003/0234916 A1 | 12/2003 | Watson | |
| 2003/0234989 A1 * | 12/2003 | Oshino | G02B 7/00 |
| | | | 359/849 |
| 2008/0048200 A1 | 2/2008 | Mueller et al. | |
| 2014/0029010 A1 | 1/2014 | Bleier et al. | |
| 2018/0259742 A1 | 9/2018 | Klassen et al. | |

FOREIGN PATENT DOCUMENTS

| | | | |
|---|---|---|---|
| CN | 108614332 A | | 10/2018 |
| CN | 208416338 U * | | 1/2019 |
| CN | 107748427 B | | 3/2019 |
| CN | 111308837 B * | 6/2022 | G03B 21/14 |
| EP | 1308765 B1 | | 3/2007 |
| WO | 2004/046766 A2 | | 6/2004 |
| WO | 2008/127816 A1 | | 10/2008 |

* cited by examiner

MOUNT FOR AN OPTICAL STRUCTURE AND METHOD OF MOUNTING THE OPTICAL STRUCTURE TO THE MOUNT

BACKGROUND

This disclosure relates to the field of mounts for high accuracy optical structures, including but not limited to, the following optical structures: reflective panels; hollow retroreflectors; roof mirrors; lateral transfer retroreflectors; and periscopes (hereinafter collectively referred to as "optical structures"). These optical structures are old in the art.

When these optical structures are made or assembled for high accuracy and precision it is important to maintain the mutual perpendicularity and/or parallel orientations of the reflective surfaces and sometimes essential to ensure that the optical structure as a whole does not move. Hereinafter, when discussing either the perpendicular or parallel orientations of the reflective surfaces of the optical structures, this specification will refer to the "orientations" of these elements.

The orientations of the reflective surfaces are affected by external stresses. With regard to high accuracy and precise reflective panels, such as mirror panels to be used for high accuracy purposes in such optical structures, it is also important to try and maintain as optically flat as possible the reflective surfaces of the panels. External stresses cause distortion of the optical flatness of the reflective surfaces of the reflective panels of the optical structures and these distortions can then cause distortion to the exiting wavefront of the exiting light ray. Such distortion of the exiting light ray increases beam deviation, thereby causing the exiting light ray to no longer be parallel to the entering (incident) light ray.

SUMMARY

It would be desirable to assemble together the elements of an optical structure in such a manner as to eliminate or reduce the external stresses. It would also be desirable that the manner of mounting an optical structure to a mount does not add to these stresses, but nevertheless, securely retains the optical structure on the mount. As such, prior art mounts for such optical structures have usually been what is know in the art as "hard mount" structures. A hard mount structure is one that maintains the dimensional stability ("DS") of the optical structure so that the external stresses acting on the optical structure do not change the dimensions of that optical structure and therefore do not effect the optical flatness of the optical structure's reflective surfaces.

The present mount also achieves secure mounting of the optical structure in a manner designed to help eliminate deflective stresses on the reflective surface(s) of the optical structure caused by the mounting of the optical structure to its mount. One or more aspects of the present mount thereby achieves DS, such that a hard mount construction is achieved. In particular, for the measurement of the DS of an optical structure and its mounting to another structure, it is important to maintain as near to perfect as possible the Optical Path Difference ("OPD") between the incident and reflected light rays entering and exiting the optical structure. To accomplish this in a hard mount configuration like that of the subject disclosure, it is important that the dimensional relationship between the reflective surfaces of the optical structure that is attached to another structure via the mounting assembly and the apex of the optical structure be maintained in all environmental conditions and changes in those environmental conditions.

Examples of external stresses that can affect the optical flatness of a reflective panel, and/or the orientations of reflective surfaces of reflective panels of the optical structures, are thermal expansion or contraction of the substrate material from which the panels are made, deflection caused the bonding materials used to join elements together and/or deflection caused by curing of adhesives between, or tightening together of, the reflective panel(s) and the item to which it is mounted, the mass of the panels themselves, as well as vibration of and/or shocks to the combined mount and optical structure.

Accordingly, it would be desirable not only to assemble together the elements of an optical structure in such a manner as to reduce these stresses, but it is equally important that the mounting system/structure used to mount the optical structure to another structure not add any significant distortional forces to the optical structure. It would also be desirable that the manner of mounting an optical structure to its mount not add to these stresses, but nevertheless, securely retain the optical structure on the mount.

It is further desirable that the manner of mounting the optical structure to the mount (hereinafter referred to as "the combined structure") allows the optical structure to move with, and be in sync with, any movement of the mount when the combined structure experiences either, or both of, vibrational or shock forces.

Accordingly, it is an object of the invention to provide an improved mount for an optical structure.

Another object of the invention is to provide an improved mount for an optical structure which causes minimal external stresses to the reflective surfaces of the optical structure.

Still another object of the invention is to provide an improved mount for an optical structure wherein the mount achieves reductions in movement of the optical structure in order to achieve higher-accuracy distance measurements.

An even further object of the invention is that the manner of mounting the optical structure to a mount allows the optical structure to move with, and be in sync with, any movement of the mount when the combined structure experiences either, or both of, vibrational or shock forces.

Yet a further object of the invention is to provide an improved mount for an optical structure wherein the mounting of the mount and optical structure to a support structure is easy and secure and adds no distortion to the wavefronts of the optical structure.

It is even a further object of the invention to provide an improved method of mounting an optical structure using the improved mount.

Other objects of the invention will in part be obvious and will in part be apparent from the following description.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown. To assist those of ordinary skill in the relevant art in making and using the subject matter hereof, reference is made to the appended drawings and figures, wherein.

DETAILED DESCRIPTION OF THE PREFERRED EMBODIMENTS

In accordance with the subject invention, an improved mount for, and method of mounting, an optical structure is provided. For ease and uniformity, the optical structure used in all of the figures is a lateral transfer retroreflector ("LTR") 10 (FIGS. 1-2 (prior art)) and 100 (FIGS. 3-6). Each LTR has a roof mirror (20, 120) and a mirror panel (30, 130). Each LTR structure is formed using known in the art methods for forming the roof mirrors and then mounting a roof mirror and a mirror panel between upper (40, 140) and lower (50, 150) support members. Each LTR may also have a front support member (60, 160) and a back support member 162 (not shown in FEGs. 1 or 2) to assist with the stability of the overall optical structure joined between the upper and lower support members, as well as a back support member (not shown).

Figure 1:
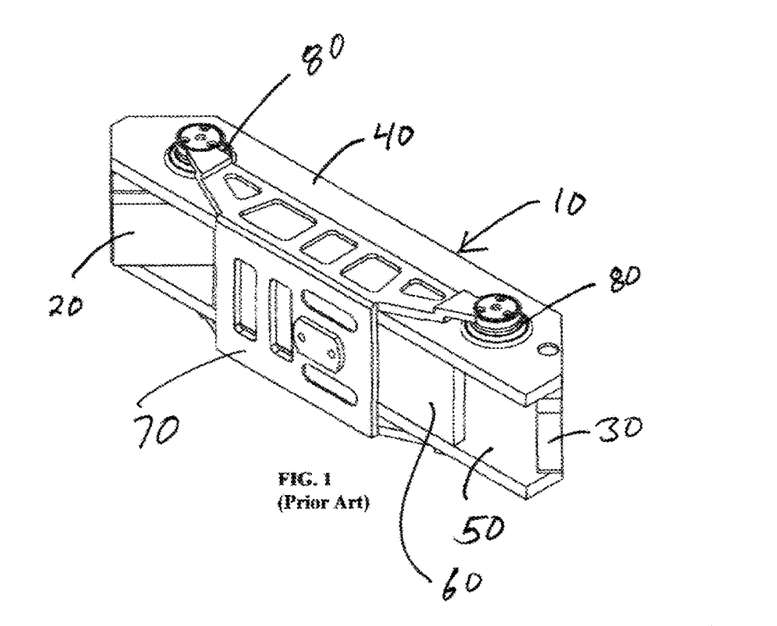
FIG. 1 is a perspective view of a prior art assembly.
Figure 2:
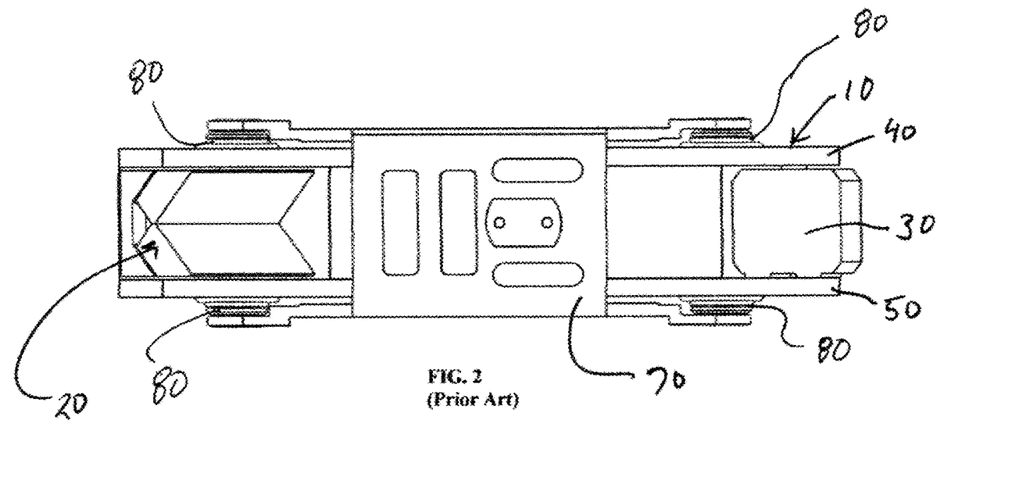
FIG. 2 is a front side elevational view of the prior art assembly of FIG. 1.
Figure 3:
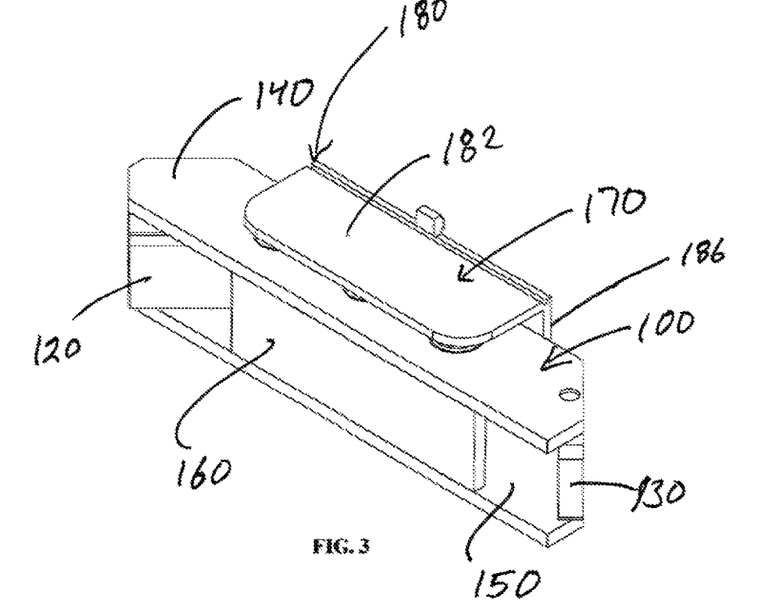
FIG. 3 is a perspective view of an embodiment of the subject invention.

In the prior art assembly shown in FIGS. 1-2, a mount 70 is shown attached to optical structure 10 on the outside surfaces of upper and lower support members 40 and 50 of optical structure 10. The attachment of mount 70 is achieved, in the prior art, through use of four mounting pads 80. Mounting pads 80 are, as previously described herein, all hard mount structures. To achieve this hard mount connection, mounting pads 80 are what is known in the art as being stiff. When the pads are made of polymeric materials, the hardness is measured using the Durometer scale. The Durometer scale measures hardness in terms of the elasticity (stiffness) of the material. As such, as used throughout this disclosure, stiffness is meant to mean the elasticity of the material as measured using the Durometer scale. For pads formed of polymeric material durometer values are broadly in the following ranges Shore 00:10-80 (for softer) and Shore A: 20-90 (for hard), but in most cases the achieved goals of this disclosure will be achieved in the ranges Shore A 40-90 (for hard) and Shore A 25-60 (for softer).

Turning now to the mounting of the subject disclosure, it is seen in an embodiment of the invention in FIGS. 3-6 that mount assembly 170 comprises a bracket element 180 comprising a top panel 182 and a bottom panel 184 joined together by a back panel 186. Bracket 180 and optical structure 100 are joined together using two sets of mounting pads. The first set of mounting pads 200 and 202 are hard mount pads, providing the stiffer connection between these components similar to that of the prior art. The second set of mounting pads 300, 302, 304 and 306 are not hard mount pads, but are instead pads of a lower stiffness. For pads formed of polymeric material durometer values are broadly in the following ranges Shore 00:10-80 (for softer) and Shore A: 20-90 (for hard), but in most cases the achieved goals of this disclosure will be achieved in the ranges Shore A 40-90 (for hard) and Shore A 25-60 (for softer).

Mounting pad 200 is between top panel 182 of bracket 180 and upper support member 140 of optical structure 100. Mounting pad 202 is between bottom panel 184 of bracket 180 and lower support member 150 of optical structure 100. In this configuration, optical structure 100 is hard mounted to bracket 180, thereby achieving all of the earlier discussed stress/deflection reducing benefits achieved by prior art constructions.

Mounting pads 300 and 302 are between top panel 182 of bracket 180 and upper support member 140 of optical structure 100. Mounting pads 304 and 306 are between bottom panel 184 of bracket 180 and lower support member 150 of optical structure 100. Use of these four, less stiff mounting pads (300, 302, 304, 306) in combination with the two hard mount pads (200, 202) achieves benefits in prevention of at least the following external stresses: thermal stress, vibrational stress and stress due to shock/impact to either the combined structure or to the overall structure to which the combined structure is attached.

For purposes of this disclosure, vibrational stresses are considered to be those that are of a substantially constant nature. Examples can include, but are not intended herein to be limited to, the vibrations felt by the combined structure of (a) a motor or motored device to which the combined structure is attached, or (b) the normal vibrations experienced by any moving device or vehicle to which the combined structure may be attached.

For purposes of this disclosure, shock/impact stresses are considered to be those short in duration as compared to vibrational stresses, usually resulting from a sudden impact to any of the combined structure or the device to which the combined structure is attached.

It is the combination of the stiff pads (200, 202) and the lower stiffness pads (300, 302, 304, 306) that allows the optical structure to move with, and be in sync with, any movement of bracket 180 when the combined structure experiences either, or both of, vibrational or shock forces. In addition, the combination of stiff (200, 202) and lower stiffness (300, 302, 304, 306) pads between bracket 180 and optical structure 100 also reduces the distortional effects of temperature fluctuations experienced by the combined structure.

Reduction of the four stiff pads of the prior art, down to two stiff pads in the subject combined structure, along with the addition of the four lower stiffness pads surpasses all of the benefits achieved in the prior art constructions by even further reducing the influence of temperature, shock impact and vibration on the reflective surfaces of the optical structure.

The lower stiffness of pads (300, 302, 304, 306) can be achieved either by a change in the formulation of the polymeric material used to make the pads and/or a change in the geometry of the pads. In either case, the measure of the material's stiffness (elasticity), namely, the material's Durometer value, is reduced as compared to the value used in pads (200, 202). When changing the polymeric material, a change to a material with a different stiffness is made. The change in polymeric material could be a change within the same material family (two different polyurethanes, for example) or a change to another material family (switching between polyurethane and rubber, for example). This disclosure anticipates any of the above changes to/of the polymeric material to achieve the stiffnesses required.

Figure 4:
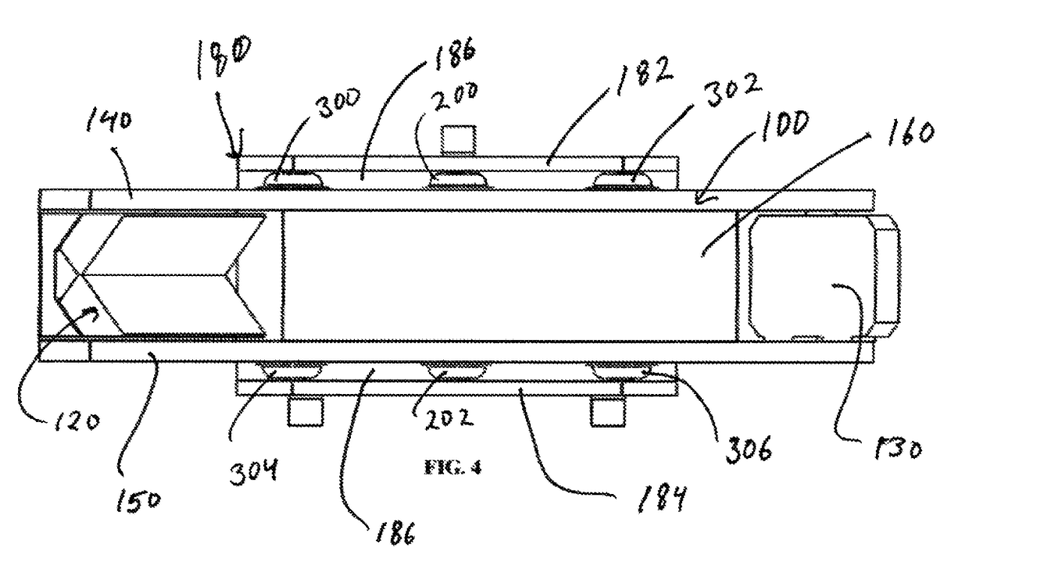
FIG. 4 is a front side elevational view of the embodiment of FIG. 3.
Figure 5:
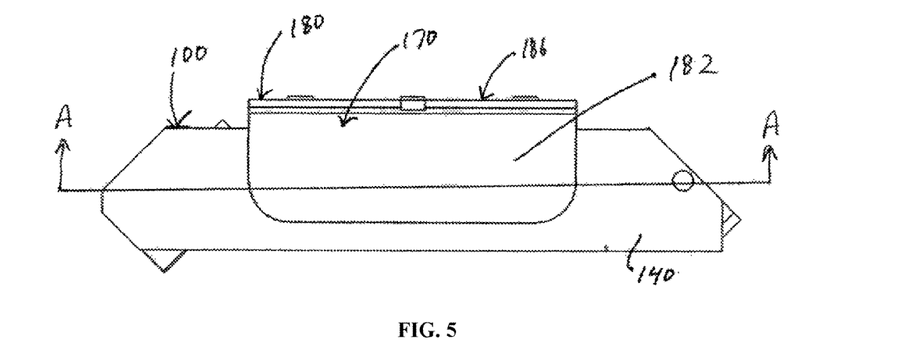
FIG. 5 is a top plan view of the embodiment of FIG. 3.
Figure 6:
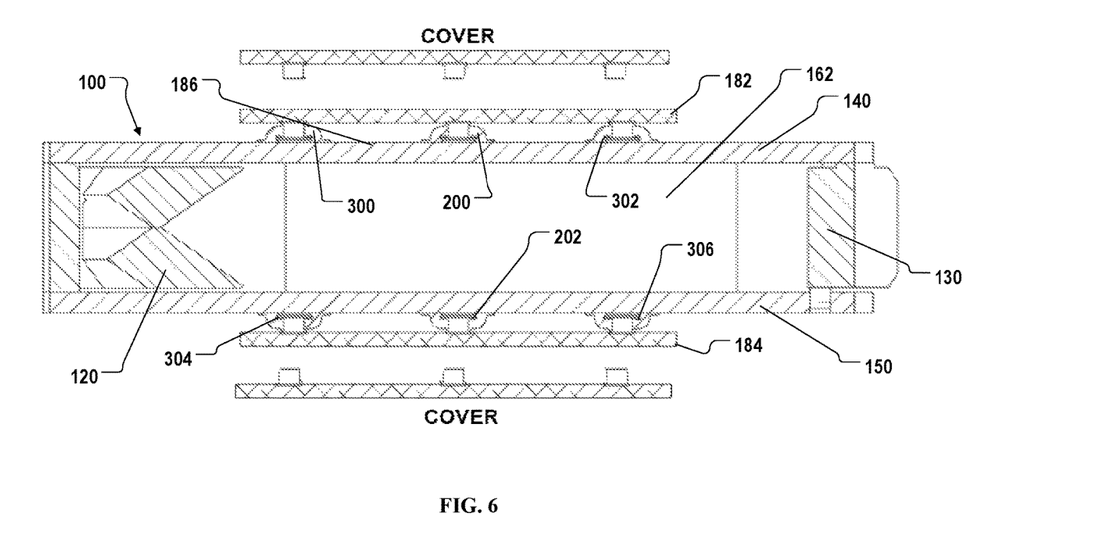
FIG. 6 is a cross-sectional view taken along line A-A of FIG. 5.
Figure 7:
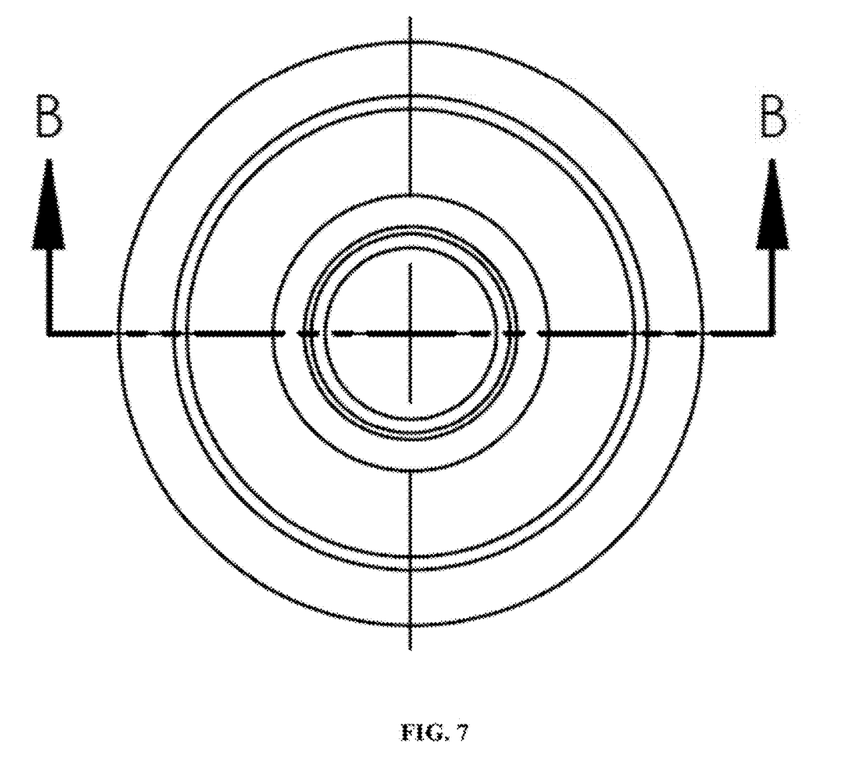
FIG. 7 a top plan view of an embodiment of the mounting pads of the embodiment of FIG. 3.
Figure 8:
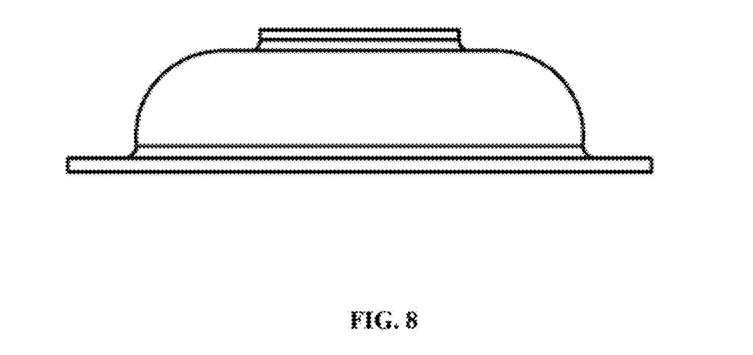
FIG. 8 is a side elevational view of the mounting pads of FIG. 7.
Figure 9:
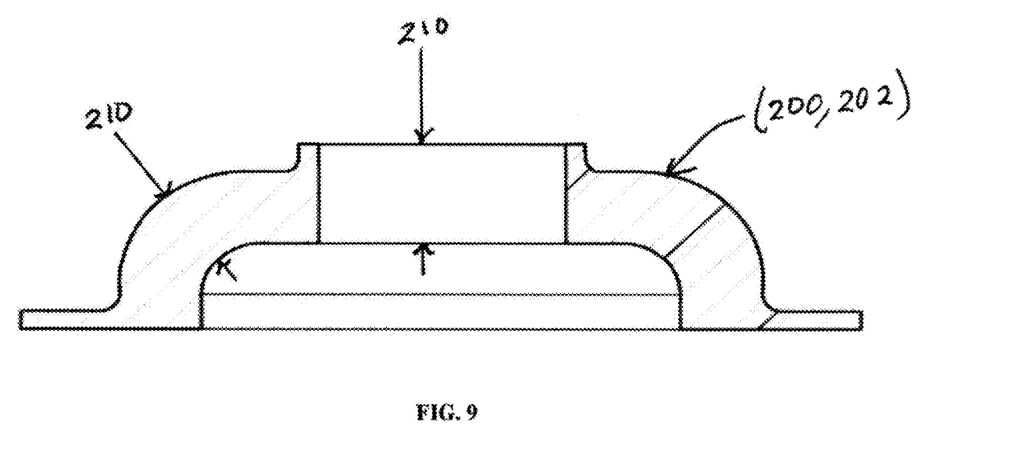
FIG. 9 is a cross-sectional view of an embodiment of one of mounting pads 200, 202 of FIG. 4, taken along line B-B of FIG. 7.
Figure 10:
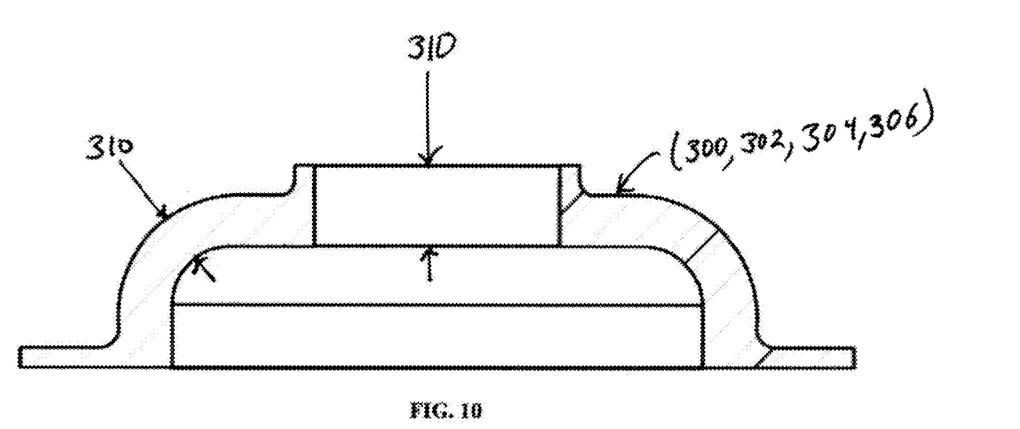
FIG. 10 is a cross-sectional view of an embodiment of one of mounting pads 300, 302, 304, 306 or FIG. 4, taken along line B-B of FIG. 7.

FIGS. 7-10 show enlarged views of both the stiff and less stiff pads of FIG. 4, and in FIGS. 9 and 10 show another way to change the stiffness of the pads. In particular, FIG. 9 shows a cross-sectional view taken through either of the stiff pads (200, 202) of FIG. 4, and FIG. 10 shows a cross-sectional view taken through any of less stiff pads (300, 302, 304, 306) of FIG. 4. As seen in these figures, the wall thickness 210 of pads (200, 202) is larger than the wall thickness 310 of pads (300, 302, 304, 306).

Yet another way to change the stiffness of the pads is to use a foamed version of the polymeric material (not shown). In such a foamed version, the nature of foaming the material gives the material a controlled distribution of air bubbles therethrough. As such, this method of forming the pads can be thought of as another variation in the geometry of the pads, as there is less of the actual material in each pad, so that the stiffness of the pad is lessened.

An even further way of changing the stiffness of the pads would be to use a combination of the above thinner wall sections with a foamed version of the polymeric material.

Other manners, known in the art, are anticipated herein for reducing the stiffness of polymeric material.

There are no standard, fixed sets of dimensions or foaming formulations defining what is a stiff pad vs. what is a less stiff pad. Each determination will depend on a number of different parameters, such as, but not limited to (a) the overall size of the optical structure being used, (b) the environment within which the optical structure will be used (space, Earth's atmosphere, under water, etc.), (c) the equipment onto which the optical structure is to be mounted, (c) the purpose to be achieved by use of the optical structure, and (d) the performance level required for the combined structure. Nevertheless, for pads formed of polymeric material durometer values are broadly in the following ranges Shore 00:10-80 (for softer) and Shore A: 20-90 (for hard), but in most cases the achieved goals of this disclosure will be achieved in the ranges Shore A 40-90 (for hard) and Shore A 25-60 (for softer).

To protect the optical structure from vibration and shock, there are opposite requirements for the pads. To handle vibration, a fairly stiff pad is more desirable, as the goal is for the optical structure to move with, and be in sync with, the mount. A soft pad could have the optical assembly still moving in one direction, when the mount is already moving in the opposite direction, resulting in either very large stresses on the pad, or the optical assembly crashing into the mount.

To handle shock loads you want a softer pad to absorb and dampen the force of the shock. A too stiff pad would transmit the shock force into the optical structure, increasing the risk of damage to the optics of the optical structure.

Accordingly, the combination of two stiff/hard mount pads (200, 202) with the four softer pads (300, 302, 304, 306) achieves the goal of further reducing the effects of these outside forces on the optics of the optical structure over what has hence been known in the prior art.

Notwithstanding anything herein that might be considered contrary to the following, it is anticipated herein that the embodiment of two stiff/hard mount pads (200, 202) with the four softer pads (300, 302, 304, 306) as shown in FIGS. 3-6 are just one embodiment of the subject invention. In particular, it is anticipated herein that there may be additional stiff/hard mount pads, as well as additional softer mount pads. It is the combination of use of stiff and softer pads that is the subject of the invention. So, for example, and without limitation to the following alternate embodiments, any of the following combinations, layouts of pads are anticipated herein between top panel 182 of bracket 180 and upper support member 140 of optical structure 100 and between bottom panel 184 of bracket 180 and lower support member 150 of optical structure 100: (a) two hard pads in the middle of two softer pads; (b) two hard pads in the middle of four softer pads; (c) one hard pad in the middle of two softer pads; and (d) any sequence of any number of hard and softer pads along any part of the length of the optical structure (i.e., additional, continuing variations to those of (a)-(c) above), including, but not limited to, sequences wherein the softer pad(s) are in the middle of the hard pad(s) (i.e., the opposite of that shown in the embodiment of FIGS. 3-6).

It is also anticipated herein that the sizes of the hard and softer pads can be variable. For example, while the depth/height of the pads between the surfaces of the panels of the bracket and the support members of the optical structure will, by necessity, be substantially uniform because the distance between the panels of the bracket and support members of the optical structure stays substantially uniform, the diameters and/or other shapes of the pads may vary so as to achieve the results anticipated by the subject disclosure. Examples of these alternate embodiments can include, but are not meant to be limited to, constructions where pads (200, 202) have larger volumes (such as, by having larger diameters) than the softer pads (300, 302, 304, 306), or visa versa.

There are a number of different options for mounting the optical structure onto the mounting structure. For example, one method involves first fixing all of the pads (200, 202, 300, 302, 304, 306) to bracket 180 and then positioning the optical structure in place between the pads and then fixing the pads to the optical structure. This method can also be reversed, where the pads are fixed to the optical structure first and then to the bracket. In either of these cases, all six of the pads would typically be assembled at the same time. Another method has the optical structure and bracket held in the correct position to one another. The bracket in this case has openings (not shown) through top and bottom panels 182 and 184 through which the pads can be fixed to the optical structure. Then, covers (not shown) are attached over the openings and these covers are fixed to the pads. In this approach the pads can be attached one at a time, all at once, one side at a time or any other order.

It will thus be seen that the objects set forth above, among those made apparent from the preceding description, are efficiently attained, and, since numerous/certain changes may be made in the above constructions and methods without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The invention claimed is:

1. A mount for mounting an optical structure to an external system, the optical structure comprising at least two mirror panels secured in reflective relation to each other between upper and lower support members of the optical structure, and the upper and lower support members each having an outside surface, the mount comprising:
   a bracket element, comprising top and bottom panels secured along a back panel;

at least first and second mounting pads, wherein the first mounting pad attaches a first portion of the outside surface of the upper support member to a first portion of an inside surface of the top panel of the bracket element, and the second mounting pad attaches a first portion of the outside surface of the lower support member to a first portion of an inside surface of the bottom panel of the bracket element;

at least third, fourth, fifth and sixth mounting pads, wherein the third and fourth mounting pads attach second and third portions of the outside surface of the upper support member to second and third portions of an inside surface of the top panel of the bracket element, and the fifth and sixth mounting pads attach second and third portions of the outside surface of the lower support member to second and third portions of an inside surface of the bottom panel of the bracket element;

wherein the at least first and second mounting pads are formed from a polymeric material having a first Durometer value, and the at least third, fourth, fifth and sixth mounting pads are formed from a polymeric material having a second Durometer value.

2. The mount as recited in claim 1, the first Durometer value being in the range of Durometer, Shore A: 40-90, and the second Durometer value being in the range of Durometer, Shore A: 25-60.

3. The mount as recited in claim 1, the first Durometer value being in the range of Durometer, Shore A: 20-90, and the second Durometer value being in the range of Durometer, Shore 00:10-80.

4. The mount as recited in claim 3, wherein the at least first mounting pad is positioned between the at least third and fourth mounting pads between the upper support member of the optical structure and the top panel of the bracket element.

5. The mount as recited in claim 3, wherein the at least second mounting pad is positioned between the at least fifth and sixth mounting pads between the lower support member of the optical structure and the bottom panel of the bracket element.

6. The mount as recited in claim 1, the first Durometer value being in the range of Durometer, Shore A: 25-60, and the second Durometer value being in the range of Durometer, Shore A: 40-90.

7. The mount as recited in claim 1, the first Durometer value being in the range of Durometer, Shore 00:10-80, and the second Durometer value being in the range of Durometer, Shore A: 20-90.

8. The mount as recited in claim 7, wherein the at least first mounting pad is positioned between the at least third and fourth mounting pads between the upper support member of the optical structure and the top panel of the bracket element.

9. The mount as recited in claim 7, wherein the at least second mounting pad is positioned between the at least fifth and sixth mounting pads between the lower support member of the optical structure and the bottom panel of the bracket element.

10. The mount as recited in claim 1, the optical structure selected from a group consisting of reflective panels, hollow retroreflectors, roof mirrors, lateral transfer retroreflectors, and periscopes.

11. The mount as recited in claim 1, wherein the first and second mounting pads are substantially vertically aligned.

12. The mount as recited in claim 1, wherein the third and fifth mounting pads are substantially vertically aligned and the fourth and sixth mounting pads are substantially vertically aligned.

13. A method for mounting a mount to an optical structure for attachment to an external system, the optical structure comprising at least two mirror panels secured in reflective relation to each other between upper and lower support members of the optical structure, and the upper and lower support members each having an outside surface, and the mount comprising a bracket element having top and bottom panels secured along a back panel, the method comprising:

affixing at least three upper mounting pads to an inside surface of the top panel of the bracket element;

affixing at least three lower mounting pads to an inside surface of the bottom panel of the bracket element;

positioning the optical structure in place in the mount substantially between the upper and lower mounting pads;

affixing the upper mounting pads to an outside surface of the upper support member of the optical structure; and affixing the lower mounting pads to an outside surface of the lower support member of the optical structure.

14. The method of claim 13, wherein the affixing the at least three upper mounting pads to the inside surface of the top panel of the bracket element occurs after the affixing the at least three lower mounting pads to the inside surface of the bottom panel of the bracket element.

15. The method of claim 14, wherein the affixing the upper mounting pads to an outside surface of the upper support member of the optical structure occurs after affixing the lower mounting pads to an outside surface of the lower support member of the optical structure.

16. The method of claim 15, wherein two of the at least three upper mounting pads and two of the at least three lower mounting pads are formed from a polymeric material having a first Durometer value, and one of the at least three upper mounting pads and one of the at least three lower mounting pads are formed from a polymeric material having a second Durometer value.

17. The method of claim 16, wherein the affixing the upper mounting pads to the outside surface of the upper support member of the optical structure and the affixing the lower mounting pads to the outside surface of the lower support member of the optical structure comprise affixing each of the one mounting pads having the second Durometer value between the two mounting pads having the first Durometer value.

18. A method for mounting a mount to an optical structure so that a combined structure can be mounted to an external system, the optical structure comprising at least two mirror panels secured in reflective relation to each other between upper and lower support members of the optical structure, and the upper and lower support members each having an outside surface, and the mount comprising a bracket element having top and bottom panels secured along a back panel, the method comprising:

affixing at least three upper mounting pads to an outside surface of the upper support member of the optical structure;

affixing at least three lower mounting pads to an outside surface of the lower support member of the optical structure;

positioning the optical structure in place in the bracket element substantially between the top and bottom panels;

affixing the upper mounting pads to an inside surface of the top panel of the bracket element; and affixing the lower mounting pads to an inside surface of the bottom panel of the bracket element.

19. The method of claim 18, wherein the affixing the at least three upper mounting pads to the outside surface of the upper support member of the optical structure occurs after the affixing the at least three lower mounting pads to the outside surface of the lower support member of the optical structure.

20. The method of claim 19, wherein the affixing the upper mounting pads to the inside surface of the top panel of the bracket element occurs after the affixing the lower mounting pads to the inside surface of the bottom panel of the bracket element.

21. The method of claim 20, wherein two of the at least three upper mounting pads and two of the at least three lower mounting pads are formed from polymeric material having a first Durometer value, and one of the at least three upper mounting pads and one of the at least three lower mounting pads are formed from polymeric material having a second Durometer value.

22. The method of claim 21, wherein the affixing the at least three upper mounting pads to the outside surface of the upper support member of the optical structure, and the affixing the at least three lower mounting pads to the outside surface of the lower support member of the optical structure, comprise affixing each of the one mounting pads having the second Durometer value between the two mounting pads having the first Durometer value.

23. A method for mounting a mount to an optical structure for attachment to an external system, the optical structure comprising at least two mirror panels secured in reflective relation to each other between upper and lower support members of the optical structure, and the upper and lower support members each having an outside surface, and the mount comprising a bracket element having top and bottom panels secured along a back panel, the method comprising:

positioning the optical structure in place in the bracket element substantially between the top and bottom panels;

affixing at least three upper mounting pads to an outside surface of the upper support member of the optical structure, through at least three openings through the top panel of the bracket element;

affixing at least three lower mounting pads to an outside surface of the lower support member of the optical structure, through at least three openings through the bottom panel of the bracket element;

attaching covers into each of the at least three openings in the upper and lower panels of the bracket element;

affixing the upper mounting pads to an inside surface of the corresponding covers of top panel of the bracket element; and affixing the lower mounting pads to an inside surface of the corresponding covers of the bottom panel of the bracket element.

24. The method of claim 23, wherein the affixing the at least three upper mounting pads to the outside surface of the upper support member of the optical structure occurs after the affixing the at least three lower mounting pads to the outside surface of the lower support member of the optical structure.

25. The method of claim 24 wherein the affixing the upper mounting pads to the inside surface of the corresponding covers of top panel of the bracket occurs after affixing the lower mounting pads to an inside surface of the corresponding covers of the bottom panel of the bracket.

26. The method of claim 25, wherein two of the at least three upper mounting pads and two of the at least three lower mounting pads are formed from polymeric material having a first Durometer value, and one of the at least three upper mounting pads and one of the at least three lower mounting pads are formed from polymeric material having a second Durometer value.

27. The method of claim 26, wherein the affixing the at least three upper mounting pads to the outside surface of the upper support member of the optical structure, and the affixing the at least three lower mounting pads to the outside surface of the lower support member of the optical structure, comprise affixing each of the one mounting pads having the second Durometer value between the two mounting pads having the first Durometer value.

* * * * *